(12) United States Patent
Potratz et al.

(10) Patent No.: US 9,767,437 B2
(45) Date of Patent: Sep. 19, 2017

(54) METHOD AND SYSTEM FOR MATCHING JOB SEEKERS WITH JOB PROVIDERS

(71) Applicant: Bryah HR Solutions, LLC, Chagrin Falls, OH (US)

(72) Inventors: Mary Elizabeth Potratz, Chesterland, OH (US); Edward Timothy Holzheimer, Pepper Pike, OH (US); David Sheeks, Chapel, NC (US)

(73) Assignee: BRYAH HR SOLUTIONS-LOGISTICS, LLC, Chicago, IL (US)

( * ) Notice: Subject to any disclaimer, the term of this patent is extended or adjusted under 35 U.S.C. 154(b) by 0 days.

(21) Appl. No.: 14/986,350

(22) Filed: Dec. 31, 2015

(65) Prior Publication Data

US 2017/0193450 A1    Jul. 6, 2017

(51) Int. Cl.
| | |
|---|---|
| *G06Q 10/10* | (2012.01) |
| *G06Q 10/06* | (2012.01) |
| *G06Q 30/08* | (2012.01) |
| *G06Q 10/00* | (2012.01) |
| *G06Q 30/02* | (2012.01) |
| *G06F 17/30* | (2006.01) |
| *G06Q 50/00* | (2012.01) |

(52) U.S. Cl.
CPC ..... *G06Q 10/1053* (2013.01); *G06F 17/3053* (2013.01); *G06F 17/30528* (2013.01); *G06Q 50/01* (2013.01)

(58) Field of Classification Search
CPC ............................ G06Q 10/1053; G06Q 50/01

USPC .................................................. 705/1.1–912
See application file for complete search history.

(56) References Cited

U.S. PATENT DOCUMENTS

| | | | |
|---|---|---|---|
| 6,272,467 B1 * | 8/2001 | Durand ................. | G06Q 10/02 705/26.1 |
| 6,662,194 B1 * | 12/2003 | Joao ...................... | G06Q 10/10 705/1.1 |
| 7,096,196 B1 | 8/2006 | Karp et al. | |
| 7,908,166 B2 | 3/2011 | Keil et al. | |
| 2006/0277056 A1 * | 12/2006 | Broberg ................ | G06Q 10/10 705/321 |
| 2008/0208907 A1 * | 8/2008 | Tolve ..................... | G06Q 10/06 |
| 2012/0239524 A1 | 9/2012 | Ouimet et al. | |

FOREIGN PATENT DOCUMENTS

WO    WO 00/45319    8/2000

* cited by examiner

*Primary Examiner* — Jonathan Ouellette
(74) *Attorney, Agent, or Firm* — Seed IP Law Group LLP

(57) ABSTRACT

Disclosed is a method of matching job seekers with job providers. The method may include receiving a plurality of job seeker values and a plurality of job provider values corresponding to at least one attribute. The method may further include receiving a job seeker priority associated with a job seeker value. Furthermore, the method may include receiving a job provider priority associated with a job provider value. Subsequently, matching between job seekers and job providers may be performed based on comparison between job seeker values and job provider values. Additionally, the matching may be based on a comparison of job provider priority and job seeker priority.

14 Claims, 10 Drawing Sheets

Name: ABC Pvt. Ltd.

Job provider view

| Job Seeker | Details | Maching Score | Invite |
|---|---|---|---|
| 1 | XXX | MS1 | Invite |
| 2 | XXX | MS2 | Invite |
| 3 | XXX | MS3 | Invite |
| 4 | XXX | MS4 | Invite |
| 5 | XXX | MS5 | Invite |

METHOD AND SYSTEM FOR MATCHING JOB SEEKERS WITH JOB PROVIDERS

FIELD OF THE INVENTION

Generally, the disclosure relates to electrical computers and digital processing systems. More specifically, the disclosure relates to methods, systems and devices for matching job seekers with job providers.

BACKGROUND

Now-a-days there is a spurt in the companies offering profile matching services. It is also apparent that the internet is the most preferred medium for job placement. Typically, the profile matching service is provided through a website where both the job providers and job seekers may register and create their profiles. The profiles may include details such as educational background, work experience, skill sets and the like. Thereafter, the job seekers and job providers are matched based on the details provided in the respective profiles. Further, the profile matching sites may provide the most suitable candidates for job providers and the most suitable jobs for the job seekers.

The current profile matching services are inflexible, in the sense that there are not many options provided for both the job seekers and job providers for customizing the profiles. The current profile matching sites do not offer efficient parameters for enhancing the match between the job seeker and the job provider. Further, the algorithms used for matching the job seeker profiles with the available jobs are not intelligent enough to provide a good match which is satisfying for both the job seeker and the job provider.

Further, the current profile matching portals match the profiles of the job seeker with the job provider based on keywords and other similar factors. Due to the limited parameters considered for matching the profiles, the short-listed candidates may not meet the expectations of the job provider.

Accordingly, there is a need for improved methods and systems for matching the job seeker profile with the jobs posted by the job providers. There is a need for method and system which factors in various parameters from the profiles of the job seekers and job provider for providing the best suitable match. Further, there is a need for providing a greater control to the job seeker and job provider for customizing the profiles which may lead to better job matches.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Disclosed is a method of matching job seekers with job providers. The method may include receiving, using a processor, a plurality of job seeker values corresponding to an attribute. Further, the method may include receiving, using a processor, a plurality of job provider values corresponding to the attribute. Furthermore, a job seeker priority associated with a job seeker value of job seeker values may be received. Further, the method may include receiving, using a processor, a job provider priority associated with a job provider value. A job seeker score associated with each job seeker may be determined. Further, the job seeker score associated with a job seeker may be determined based on each of a comparison of job seeker values with the plurality of job provider values and a comparison of the job seeker priority with the job provider priority. Furthermore, a job provider score associated with each job provider may be determined, using a processor. The job provider score associated with a job provider may be determined based on each of a comparison of job seeker values with the plurality of job provider values and a comparison of the job seeker priority with the job provider priority.

In some embodiments, the one job seeker priority and the job provider priority may comprise a maximum value and a minimum value.

In some embodiments, a job seeker score associated with a job seeker of the plurality of job seekers may be determined based on each of a value-distance between the plurality of job seeker values and the plurality of job provider values and a priority-distance between the job seeker priority and the job provider priority. Further, a job provider score associated with a job provider of the plurality of job providers may be determined based on each of a value-distance between the plurality of job seeker values and the plurality of job provider values and a priority-distance between the job seeker priority and the job provider priority.

In some embodiments, a selection of the plurality of attributes from of a job seeker and a job provider may be received using a processor.

In some embodiments, the method may further include receiving, using a processor, a job seeker priority corresponding to an attribute of the plurality of attributes. Furthermore, a job provider priority corresponding to the attribute may be received using a processor. The job seeker score may be determined based further on a comparison of the job seeker priority corresponding to an attribute with the job provider priority corresponding to the attribute. Further, the job provider score may be determined based further on a comparison of the job seeker priority corresponding to an attribute with the job provider priority corresponding to the attribute.

In some embodiments, a plurality of job profiles corresponding to the plurality of job seekers may be displayed using a processor. The displaying of the job profiles may be performed based on the job seeker score associated with each job seeker of the plurality of job seekers.

In some embodiments, displaying of the job profiles may be performed in response to a selection of a job posting corresponding to a job provider.

In some embodiments, the method may include receiving, using a processor, an invite input corresponding to a job profile of the plurality of job profiles. Further, an invitation to a job seeker corresponding to the job profile may be transmitted. Further, the invitation may include the job posting.

In some embodiments, the displaying of a job profile of the plurality of job profiles may be based on an access restriction provided by a job seeker associated with the job profile. The access restriction may forbid displaying of a profile data that may be included in the job profile.

In some embodiments, the method may further include receiving, using a processor, a request for viewing the profile data. Further, a grant for viewing of the profile data may be received. Further, the displaying of the job profile that may include the profile data may be based on the grant.

In some embodiments, a plurality of job postings corresponding to the plurality of job providers may be displayed, using a processor. Further, the displaying of the job posting may be performed based on the job provider score associated with each job provider of the plurality of job providers.

In some embodiments, the displaying of the job postings may be performed in response to a selection of a job profile corresponding to a job seeker.

In some embodiments, apply input corresponding to a job posting of the plurality of job postings may be received using a processor. Thereafter, a job application to a job provider corresponding to the job posting may be transmitted. In an instance, the job application may comprise the job profile.

In some embodiments, the job application may further include a job seeker score associated with the job seeker.

In some embodiments, the method may include retrieving, using a processor, profile data corresponding to a job seeker. Further, at least a part of a job profile associated with a job seeker of the plurality of job seekers may be generated, using a processor, based on the profile data.

In some embodiments, a data source for performing the retrieving may be a government database.

In some embodiments, each job seeker may be associated with a job profile, wherein a content and a form of the job profile may be based on a governmental regulation.

In some embodiments, the method may further include detecting, using a processor, a conflict based on the plurality of job seeker values and a plurality of job seeker priorities of the job seeker priority.

In some embodiments, a conflict may be detected based on the plurality of job provider values and a plurality of job provider priorities of the job provider priority.

In some further embodiments, a likelihood of match corresponding to a job seeker of the plurality of job seekers may be predicted. Further, the predicting of the likelihood of match may be performed based on an analysis of each of the plurality of job seeker values and the job seeker priority.

Also disclosed may be a system for matching job seekers with job providers. The system may include a processor and a memory communicatively coupled to the processor. The memory may be configured to store program code which when executed by the processor, may cause the system to receive a plurality of job seeker values corresponding to an attribute of a plurality of attributes. Further, the execution of the program code may cause the system to receive a plurality of job provider values corresponding to the attribute of the plurality of attributes. Furthermore, the execution of the program code may cause the system to receive a job seeker priority associated with a job seeker value of the plurality of job seeker values. Further, the execution of the program code may cause the system to receive a job provider priority associated with a job provider value of the plurality of job provider values. A job seeker score associated with each job seeker of a plurality of job seekers may be determined. Further, the job seeker score associated with a job seeker may be determined based on each of a comparison of the plurality of job seeker values with the plurality of job provider values and a comparison of the job seeker priority with the job provider priority. Furthermore, a job provider score associated with each job provider of a plurality of job providers may be determined. The job provider score associated with a job provider may be determined based on each of a comparison of the plurality of job seeker values with the plurality of job provider values and a comparison of the job seeker priority with the job provider priority.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 8 illustrates an exemplary view provided to a job provider in accordance with various embodiments.

DETAILED DESCRIPTION

Figure 1:
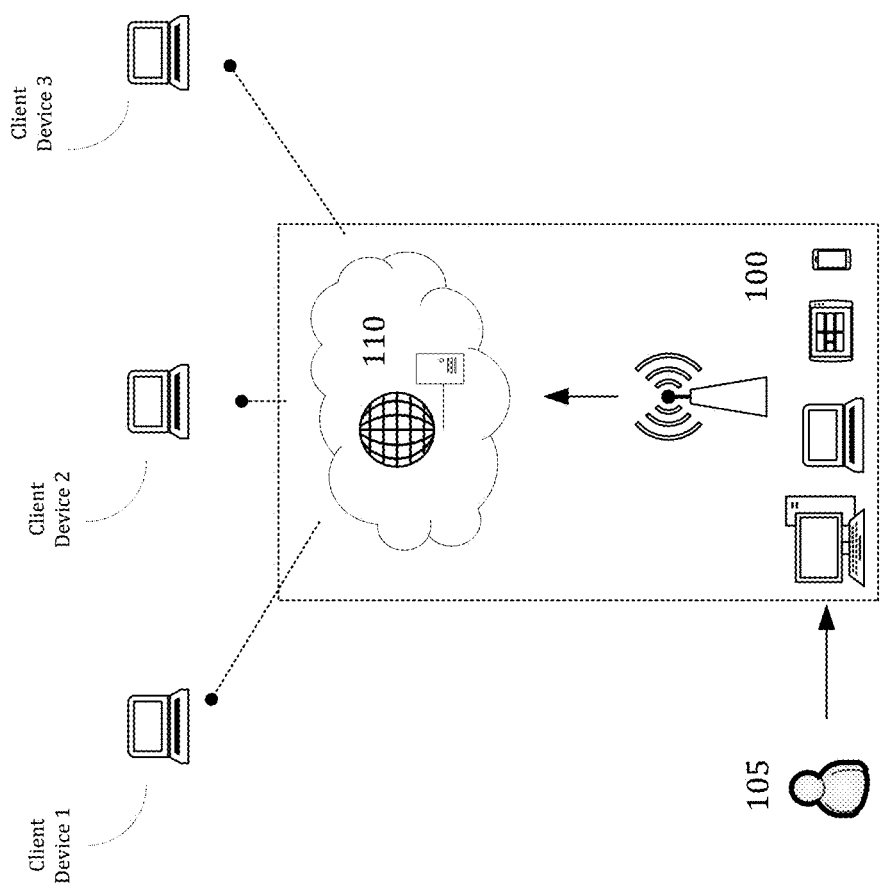
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of human resources, embodiments of the present disclosure are not limited to use only in this context such as, for example, online dating.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

The Profile Matcher may provide a deterministic method to compute a relative "Match Score" between a "Consumer" and a "Product or Service", based on a set of attributes of the product or service and the consumer's preferences for given values of the attributes. In an instance, the consumer may be at least one of, but not limited to, a job provider and a job seeker. The product may be at least one of a job post and a job profile. The Match Score may represent a level of satisfaction of the consumer with the product or the service. For example, a high match score may indicate a higher level of satisfaction of the consumer with the service. The Match Score is intended to identify more preferable services for the Consumer, but does not necessarily indicate a better match from the perspective of the service to the consumer. It may be possible that a better match from the perspective of the consumer may be in fact a less desirable match from the perspective of the service.

In an instance, computing match scores may be a two step process. Firstly, the consumer may go through an exercise to create a "Profile" by selecting a subset of attributes that may be most important to them. Thereafter, for each attribute selected, the consumer may indicate the most important attribute value and the least important attribute value (a "max diff" attribute value selection). The profile may be then used to compute the Match Score for any applicable service. Further, the match score may be presented to the Consumer to indicate a relative match between the Consumer's preferences and the service.

In the Profile Matcher, a set of independent attributes may be maintained common to all instances of the service. Each attribute may have a discrete set of possible values, such that a given Product or Service either has a specific attribute value or does not have it. For example, an attribute for a truck driver who may be creating a profile in the Profile Matcher may be "Experience". The attribute "Experience" may indicate the total truck driving experience of the driver.

In an instance, each service may have one or more values for each attribute, however having at least one value for each individual attribute may not be required. Any service with no applicable values for a given attribute may automatically have a lower Match Score if the attribute is selected by the consumer.

In another instance, attributes may be grouped into categories for presentation purposes, and selection of at least one attribute from each or any given category or categories may optionally be enforced as part of the consumer's Profile Matcher Profile creation exercise. The consumer may go through a simple, two step exercise to create a Profile representing the consumer's preferences related to the attributes values using the service. A full set of Attributes may be presented to the consumer along with a brief description to help the Consumer understand the meaning and/or purpose of the Attribute. The Consumer selects the set of Attributes that may be most important from his or her perspective in selecting a specific entity of the service. A minimum and/or maximum number of selected Attributes may be enforced during the Attribute Selection process. In case the Attribute Categories may be used, the Attributes may be displayed within the groups and any rules associated with enforcing selection of Attributes from the Attribute Categories may be enforced.

Thereafter, the Consumer steps through each selected attribute and uses a simplified rating process to provide relative ratings to the values for each Attribute. All of the possible values for the Attribute may be presented, and the Consumer select the single "Most Important" and single "Least Important" value for the Attribute from his or her perspective.

In some embodiments, a simple Maximum Differential ("Max Diff") approach used in the Profile Matcher may provide an efficient way to get a relative rating for the possible values for each selected Attribute. One Attribute value may be identified as having the maximum relative importance, one the least relative importance, and the others a mid-level relative importance. This provides a relative rating for all possible Attribute values, with one identified as having the maximum relative value, one the minimum relative value, and the rest an equal middle relative value. For Attributes with small numbers of values, the Profile Matcher may provide a good relative rating for values. As the number of values for a given Attribute increases, the larger number of values with the equivalent middle relative values may make differentiating matching values between the Consumer's preferences and the Product or Service Attribute values less clear. Further, tuning adjustments can be made for such attributes to improve the match scoring.

Once a Consumer profile is created, it may be used to compute "Match Score" values for all available entities in the service. A score computing algorithm for computing the "Match Score" values may be designed to generate a value between 0 (zero) and 1 (one). The actual value may be meaningful only in relative terms to "Match Score" values for other Products or Services. The algorithm may include various tuning parameters to optimize matching for different types of Products and Services with different numbers and types of Attributes.

The Profile Matcher algorithm may compute Match Score values for an individual entity using the following process. The selected Attributes from the Consumer Profile may be given a Score Weight between 0 and 1 based on the number of Attributes selected. For example, if 5 attributes are selected then each Attribute Score Weight would be 0.2. For each selected Attribute, the Attribute Values in the Customer Profile may be compared with the Attribute Values associated with product or service. Each Attribute may have a "Weight Adjustment Factor" which may be a value between zero and one. These values default to one, but may be tuned to give added weight or to reduce the weight of individual Attributes. The Component Score may be multiplied by the Attribute's Weight Adjustment Factor and then multiplied by the Attribute Score Weight to determine the Partial Component of the Match Score for the Attribute. The Partial Component values may be added together to determine the Match Score, which may be limited to maximum value of 1.0. In some instances, "Weight Adjustment Factor" values may result in a sum of Partial Component values being greater than 1.0. In such a case, the Match Score may be simply assigned a value of 1.0, e.g. a "best match".

The Attribute Component Score values may be computed based on Attribute specific matching factors for the "Most Important", "Least Important" and "Other" (between most and least important) Attribute Value matches. The computation may be performed by setting the Attribute Component Score to zero. A "Unit Score" between zero and one may be determined as the reciprocal of the number of Attribute Values for the Attribute. For example, if there are 4 Attribute Values, the Unit Score would be 0.25. If the "Most Important" Attribute Value matches, the Unit Score may be multiplied by the "Most Important Match Factor" for the Attribute and that may be added to the Component Score. If the "Least Important" Attribute Value matches, the Unit Score may be multiplied by the "Least Important Match Factor" for the Attribute and that may be added to the Component Score. Finally, the number of "Other" matches may be multiplied by the Unit Score and by the "Other Match Factor" for the Attribute and that may be added to the Component Score. If the Component Score is greater than 1.0, the value may be set to 1.0 (Component Scores greater than 1.0 may be not allowed).

In an instance, the 0 to 1.0 value for the Match Score may make it simple to multiply the value by a given constant (e.g. 10) and provide a value to display in the range 0 to 10. However, depending on the Attributes selected and the entities involved, it may be virtually impossible to see a Match Score at the top of the range (i.e. 1.0, or 10 as a display value). The Attribute and "Match Factor" adjustments can be used to tune the computation to get values closer to 1.0 for "better looking" results. However, it may be important to recognize that the Match Scores may be relative scores that help identify that one product or service as being preferable over another product or service.

For the Profile Matcher application, the scores may be calculated for job seekers (the Consumer) relative to Job Opportunities (the Product). Attributes may be grouped into Attribute Categories. However, no rules may be enforced requiring or limiting selection of Attributes from individual categories. The driver may select a minimum of 4 and a maximum of 10 attributes when creating a Consumer Profile. The Match Scores may be multiplied by 10 for display to the Drivers. Attributes Weights may not be changed from the default of 1.0. However, the Attribute Value Match Factor values may be set to tune the results, particularly for Attributes with larger numbers of Values where a "Most Important" match may be significantly more important than "Other" or certainly "Least Important" matches.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1 illustrates one possible operating environment through which a platform consistent with embodiments of the present disclosure may be provided. The operating environment may comprise methods, systems, and devices collectively referred to as a platform. The platform may include a profile matching server 100 in communication with client devices such as client device 1-3. The communication may be performed over a network 110. Although the present disclosure refers to various functions and operations performed by particular components of the platform (e.g., profile matching server or client devices), it should be understood that some platform components may be interchanged with others, and/or, where necessary, combined with other components to perform the functions and operations intended.

By way of non-limiting example, a profile matching server 100 may be interconnected using a network 110. In some embodiments, network 110 may comprise a Local Area Network (LAN), a Bluetooth network, a Wi-Fi network and a cellular communication network. In other embodiments the profile matching platform may be hosted on a centralized server, such as, for example, a cloud computing service. A user 105 (e.g., a job seeker, a job provider) may access platform 100 through a software application. The software application may be embodied as, for example, but not be limited to, a website, a web application, a desktop application, and a mobile application compatible with a profile matching server 100. One possible embodiment of the software application may be provided by profile matching software, which may include a score computing algorithm, executed on the profile matching server 100 and remotely accessible using electronic devices such as laptop or tablet computers.

As will be detailed with reference to FIG. 1 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

The profile matching server 100 may be configured to communicate with each of client devices 1-3 over the network 110. Further, the profile matching server 100 may be configured to provide a user interface to the user 105. Accordingly, the user 105 may interact with the profile matching server 100 in order to create a profile which may include one more attributes associated with the user 105. For example, the profile matching server 100 may display a GUI to the user 105 in order to provide values to one or more attributes of a profile and set appropriate levels of priorities to the values associated with the attributes of the profile. Further, the GUI may enable the user 105 to select a priority level corresponding to the attributes of the profile. The user 105 may be, for example, a job seeker or a job provider. Subsequently, the profile matching server 100 may be configured to compute a job seeker score and a job provider score based on the values of the attributes and the corresponding priorities thereof. Thereafter, the profile matching server 100 may be configured to match the job seeker profiles with suitable job provider profile and generate a list of best matched profiles.

III. Platform Operation

Figure 2:
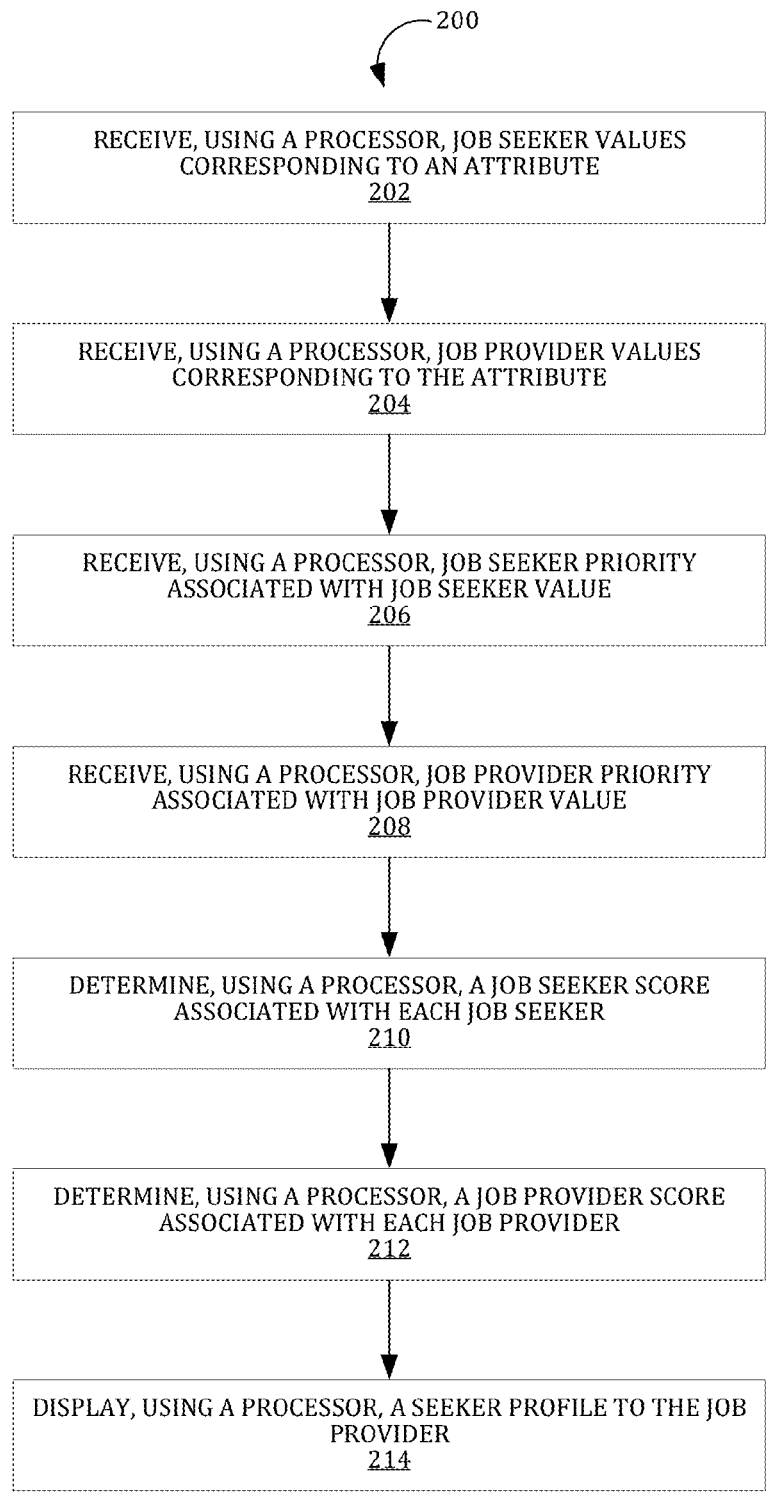
FIG. 2 illustrates a flow chart of a method of matching job seekers with job providers according to various embodiments.

FIG. 2 illustrates a flow chart of a method of matching job seekers with job providers, in accordance with various embodiments. Typically, a profile matching service may require both the job seeker and the job provider to register with the profile matching portal. In one such instance, a job seeker may register with the profile matching service by creating an account. The registration may begin with the job seeker assigning an email ID and a password for the account. Thereafter, the job seeker may provide a value to a number of attributes which may be a part of the profile. The attributes may include for example, personal and professional details of the job seeker. The personal details may include, for example, name, date of birth, address and contact number. The professional details may include duration experience in a particular profession, expertise in a certain skill set, educational background and the like. For example, the job seeker may be a truck driver. The truck driver may provide values to the one or more attributes of the profile. The professional attributes for the truck driver may include schedule, location, benefits and other preferences of the truck driver. Further, the attributes may include the type of cargo handled and the routes which the driver has delivered the cargo.

Similarly, a job provider who may be looking for suitable employees may also register with the profile matching service. The job provider may create an account and fill in one or more values to the attributes which may be presented to the job provider. The job provider may provide values of the organizational and job posting related attributes. In one instance, the job provider may be a trucking company looking for suitable drivers for one or more truck driving positions which may be open. The job provider may first fill in the values for the attributes pertaining to the organization such as the field in which the organization functions, number of employees and the projects which may be under taken. Thereafter, the job provider may post one or more job posting with the profile matching service. For each job posting, the job provider may fill in values for the attributes associated with the particular job posting. For example, the trucking company may fill in the values for one or more attributes associated with the job posting. The attributes associated with the job posting may be, for example, a skill level, an experience level, a qualification and details regarding the type of cargo handled and the routes in which the cargo was delivered.

Referring to FIG. 2, at step 202, job seeker values corresponding to an attribute may be received using a processor. As explained above, the attributes may be various parameters associated with the profile of the job seeker. For example, the attributes may be parameters associated with the personal and professional details of the job seeker. In one instance, the job seeker may provide values to the attributes associated with the professional experience thereof. In one such case, a truck driver may be applying for a job vacancy posted by a job provider. The truck driver may provide values for attributes such as type of cargo handled, type of driving license, routes travelled and the like. These attributes may be relevant to the job vacancy to which the job seeker may apply.

In some embodiments, the job seeker may provide values as a part of the profile filling exercise. The attributes which may be filled may be used by the profile matching service at a later instance to find a suitable job vacancy which matches the expectations of the job seeker. In some instances, the attributes may be presented to the job seeker when the job seeker applies to a particular job vacancy posted by a job provider. The particular job for which the job seeker applied may require the job seeker to fill values for a different set of attributes which may not be present in the profile of the job seeker. For example, the job seeker may be in the process of applying for a job for a company in another country. In such a case, the job seeker may be presented with additional attributes such as citizenship status and visa status of the job seeker.

At step 204, job provider values corresponding to the attribute may be received using a processor. Like the job seeker, the job provider may provide values to one or more attributes as a part of completing a profile or job vacancy. The job provider may provide values to attributes which relates to the company associated with the job provider. Further, the job provider may also provide values to attributes associated with a job vacancy which the job provider may post with the profile matching service. In an exemplary instance, the job provider may provide values to one or more attributes for a job vacancy which may be identical with the attributes presented to the job seeker.

In some embodiments, the job provider may fill in values for additional attributes based on a particular job vacancy. For instance, a job provider may be posting a job for a project manager in a software company. For this vacancy, the job provider may fill in additional details such as certifications associated with project management such as SCRUM and AGILE. Thereafter, when a job seeker is interested in applying for the job, the job seeker may be presented with the additional attributes for filling in the values for the same.

At step 206, a job seeker priority associated with the job seeker value may be received using a processor. The job seeker priority may be a measure of a priority that the job seeker assigns for a particular job seeker value. The job placement service may provide an additional option for the job seeker to set the job seeker priority for a particular job seeker value. The job seeker priority may provide the profile matching service with an additional parameter for calculations in the job matching process.

In some embodiments, the job seeker priority may be provided at the time of filling in the values associated with one or more attributes of the job seeker. In some embodiments, the job seeker priority may correspond to job seeker preferences. The job seeker preferences may indicate some aspects about the job which may be most important to the job seeker. In an instance, a truck driver (job seeker) may be filling in values for some attributes in the profile. Thereafter, the profile matching service may provide options to fill in some preferences of the truck driver. The preferences may be associated with the nature of work, leave type, additional perks, type of haul and so on. The truck driver may provide one or more preferences which the truck driver regards as important. Further, the profile matching service may provide additional options associated with each of the preferences. When the additional options are presented, the truck driver may select one or more of a most important option and the least important option. For example, the truck driver may be presented with attributes related to work, pay, retirement plans, personal development and the like. Further, the driver may select the appropriate options associated with each of the attributes. For example, further options associated with the attribute work may include at least one of, but not limited to, type of work, type of schedule, duration of trip and a type of cargo.

In some embodiments, the job seeker priority may be a quantitative value associated with an attribute. For example, a job seeker may be a software engineer with a number of skills in a domain. The software engineer may be having expertise in four programming languages (L1, L2, L3 and L4) and testing software (T1). The software engineer may furnish this information under the attribute skill set. Further, the software engineer may be provided with an option to assign a priority to each of the skills in the skill set. For example, the software engineer may provide a numerical value as the priority for the languages in the skill set. The software engineer may provide value of (8, 6, 4, 7) for the languages (L1, L2, L3 and L4) and value of 9 for the testing software T1, wherein the range of priority values available may be 1-10 with 10 representing highest priority.

In some embodiments, the job seeker priority may be provided in terms of binary values. The binary values may be presented as options such as, but not limited to, "most important", "least important", "most preferred" and "least preferred". For instance, the profile may include attributes such as details regarding pay and leave policies. In such cases, the job seeker may be provided with binary options for indicating a priority. In an exemplary instance, the job seeker may be presented with payment method and a few payment options under the same. The options may be daily payout, weekly payout, fortnightly payout and monthly payout. In this case, the job seeker may provide the priority value by selecting the most preferred and the least preferred choices.

In some embodiments, a conflict alert may be provided to the job seeker based on the value of the attribute and the priority value which the user assigns to the value. For example, a truck driver may select a value "Interstate travel" under the attribute "Travel type" and may assign a high priority to the same. Further, the truck driver may select a value "Weekend—Non-working" under the attribute "Perks" and assigns a high priority. In this case, there may be a conflict between the choice of interstate travel and non-working weekends. The truck driver who has chosen interstate travel with a high priority may not expect weekends to be non-working, as interstate travel may sometimes span over a week.

Figure 3:
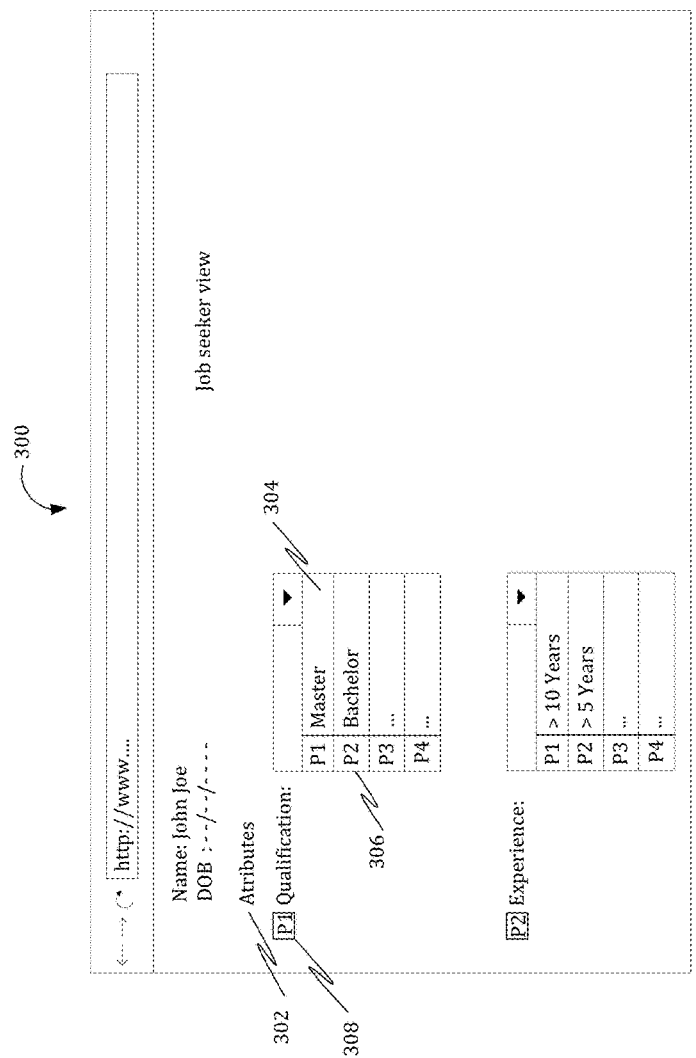
FIG. 3 illustrates an exemplary view as presented to a job seeker for providing job seeker values and job seeker priority according to various embodiments.

FIG. 3 illustrates an exemplary view as presented to a job seeker for providing job seeker values and job seeker priority, in accordance with an embodiment. The view may be presented in the form of a website or an application which may be accessed using a mobile device. The view may include information associated with the profile of the job seeker. Further, the profile may include attributes 302 for which the job seeker may provide values. In FIG. 3, one may observe that qualification may be one of the attribute. Next to the attribute qualification, there may be a drop down menu which may list all the relevant values 304. For example, the values provided to the user may include a Master's degree, Bachelor's degree and so on. The job seeker may select the appropriate value based on the actual qualification thereof. Further to selecting the value for the attribute qualification, the job seeker may select a priority value for the same. The priority values 306 ($P_1, P_2 \ldots PN$) may be assigned to each of the attributes based on a preference of the job seeker. For example, the job seeker may provide a lower priority for the value under the attribute qualification and provide a higher priority for the value under the attribute experience. In this manner, the job seeker may provide a higher weight to his/her experience rather than the educational qualifications. Further, referring to FIG. 3, the attribute 302 may include experience. The user may be provided with a drop down menu which indicates various ranges of experience in years. The job seeker may select one of the options as a value 304 to the attribute "Experience". For example, the job seeker may select the experience as ">10 years". Further, the job seeker may assign a priority 308 to the value under the attribute "Experience". Likewise, the job seeker may fill in the job seeker values and the corresponding job seeker priority for the number of attributes which may be presented to the job seeker.

At step 208, a job provider priority associated with the job provider value may be received using a processor. The job provider priority may indicate a level of importance that the job provider associates with the values of the attributes. For example, the job provider may want to hire candidates who may be willing to travel 70% of the time. Now, travel requirement may be an attribute of the job posting. Under the attribute travel requirement, the job seeker may provide a priority to indicate that the candidate may travel 70% of the time.

In some embodiments, the job provider may provide job provider priority to indicate a level of skill desired for a particular job vacancy. For example, the job provider may be a software company hiring software developers. When the software company may be posting a job vacancy with the profile matching service, the job provider may provide values to the attribute "Skillset". The values under the attribute "Skillset" may be programming languages L1, L2, L3 and L4. Further, the job provider may assign job provider priority for the values, indicating as to which programming languages matter the most to the job provider. For example, the job provider may provide priority values 5, 9, 7 and 3 for the programming languages L1, L2, L3 and L4. Further, the job provider may provide priority values to the values of the attributes in other ways such as binary preferences. For example, the job provider may select choices such as "most important" and "least important" for the values of an attribute.

In some embodiments, a conflict alert may be provided to the job provider in case the job provider selects one or more of conflicting values for the attributes and priorities to the values. For example, the job provider, a trucking company, may be looking for candidates who may be fine with company's share instead of a pension plan. Thereafter, the job provider may select the value "Employee share program" under "Payment perks" and provides a high priority value. Subsequently, the employer may select "pension plan" under the attribute "Retirement" and may assign a high priority for the same. This may be a conflicting selection, as a job provider who may be providing a high value to the employee share program in lieu for the pension plan, may not assign a high priority for the pension plan. When the job provider performs this conflicting selection a conflict alert may be provided to the job provider.

Figure 4:
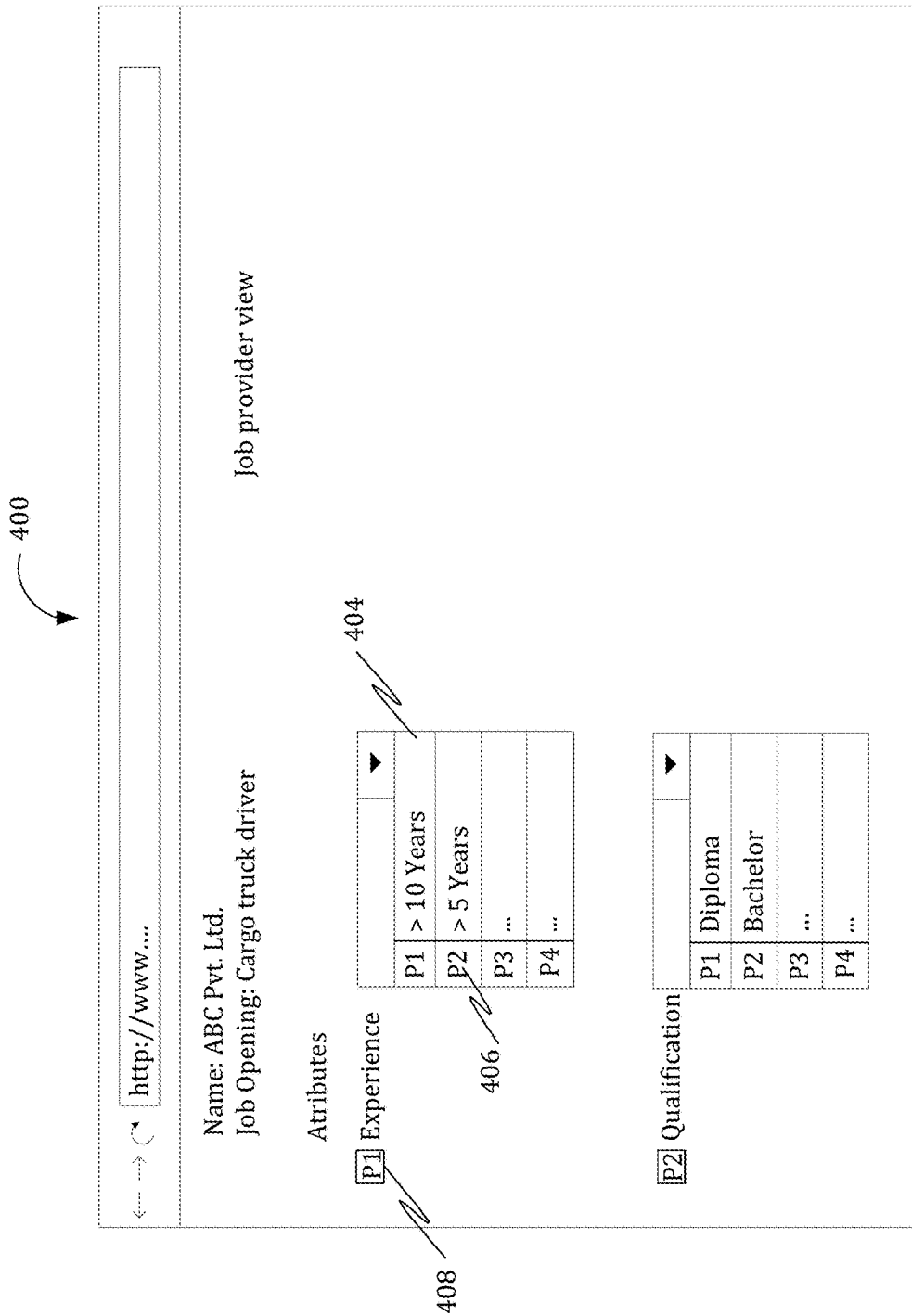
FIG. 4 illustrates an exemplary view as presented to a job provider for providing job provider values and job provider priority according to various embodiments.

FIG. 4 illustrates an exemplary view as presented to a job provider for providing job provider values and job provider priority, in accordance with some embodiments. In FIG. 4, the job provider may login to the respective account in order to fill in the attribute values and priority. The job provider view may include a number of attributes 402 such as, for example, qualification, experience, skill set and the like. For example, the job provider may be provided with an attribute "Experience" for which the job provider may furnish a value 404 from the dropdown menu. Further, the job provider may select a value for the attribute qualification. In this case, the job provider may assign a priority value 406 for the attribute. In an example, the job provider may assign a high priority value 406 for the qualification rather than experience. In other words, a higher priority value to the attribute qualification may indicate that the job provider may be looking for candidates with a better qualification rather than experience.

At step 210, a job seeker score associated with each job seeker may be determined. The job seeker score may be a cumulative score computed by considering the values for one or more attributes and the priorities associated with the values. For example, the job seeker score may be computed by considering the job seeker values for the one or more attributes associated with the job seeker profile. Additionally, the job seeker score may be computed by considering the job seeker priorities associated with the job seeker values. The computation of the job seeker score is explained in detail in conjunction with FIG. 3.

At step 212, a job provider score associated with each job seeker may be determined, using a processor. The job provider score may be computed by considering the values of the attributes associated with the job provider. Additionally, the job provider score may be computed by considering the job provider priority associated with the values of the job provider attributes. In some embodiments, the job provider score may be computed using a similar manner as the job seeker score. Further details regarding the computation of the job provider score is explained in conjunction with FIG. 5.

At step 214, job seeker profiles may be displayed to the job provider based on a match between the job seeker score and job provider score using a processor. After the determining the job seeker and the job provider scores, the scores may be used to match the best suited job seekers with the best suited job provider. In other words, the job provider may be provided with a list of best suited job seekers based on the corresponding job seeker scores.

Figure 5:
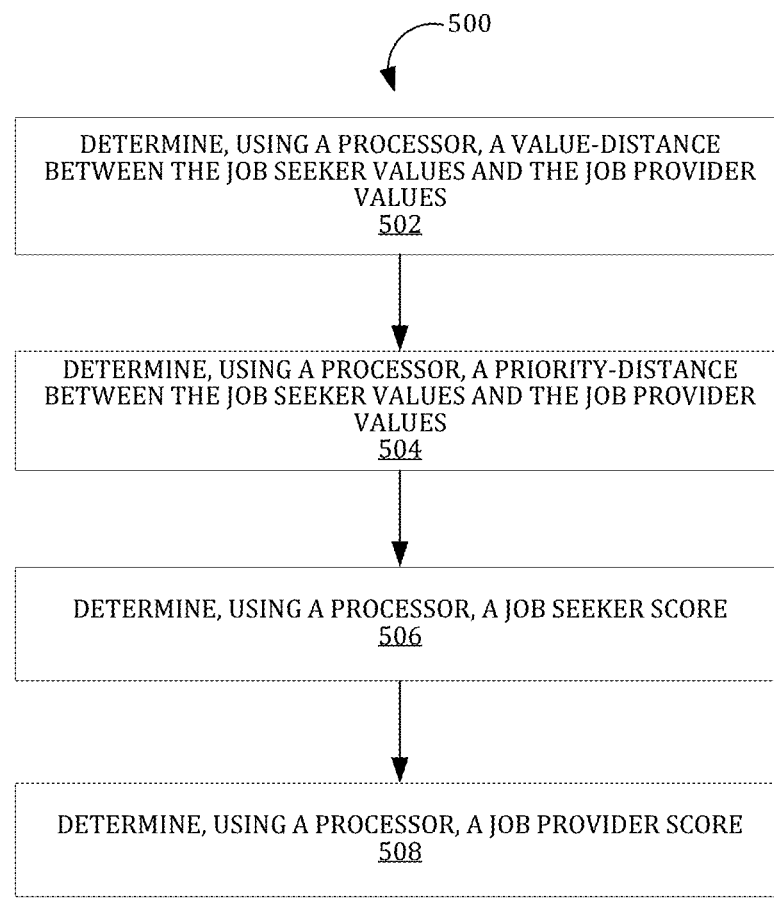
FIG. 5 illustrates the method steps involved in computing job seeker score and job provider score according to various embodiments.

FIG. 5 illustrates the method steps involved in computing job seeker score and job provider score, in accordance with an embodiment. The basis for computing the score may be to determine the similarity between the expectations of the job seeker and the job provider. For every job seeker profile and job provider profile a score may be computed. The score values may be computed to be a value between 0 (zero) and 1 (one), where 1 indicate an optimal match and a zero indicates a bad match. The score computing algorithm may include various tuning parameters to optimize matching between the job provider and job seekers with different values and priorities for different attributes. At step 502, a value-distance between the job seeker values and the job provider values may be determined using a processor. The value-distance may indicate the similarity between the values provided by the job seeker in comparison with that of the values provided by the job provider. For example, in a truck driving scenario, an attribute may be "type of truck" which the job seeker has driven the most. For such an attribute, a job seeker may provide the value as a passenger vehicle. For the same attribute, the job seeker may have provided a value of livestock vehicle. In such a case, there may be some distance between the values of the job seeker and the job provider. However, the distance may be less when compared to another job seeker who has selected the value to be cargo trucks. Here we can observe that there may be a difference between driving a livestock truck and a cargo truck. However, the difference may be less between driving a passenger vehicle and a livestock vehicle. In this case, the job seeker providing a value of livestock vehicle may be a closer match as compared to a job seeker with experience in driving cargo trucks. Further, the job seeker providing a value of passenger truck for the attribute "type of truck" may be the best match for the job provider and likewise the distance measure may be calculated.

At steps 504 and 506, a priority-distance between the job seeker values and the job provider values may be determined using a processor. The priority distance may indicate a measure of the similarity of expectations from the job for a job seeker and expectations from a candidate for a job provider. During the profile creation, the job seeker and the job provider may have provided priority values to the values for the attributes. The priorities of the job seekers and the job providers may be compared to determine a priority-distance. For example, a truck driver looking for a job provides a priority 10 (highest) for non-working weekends. Similarly, a truck company may be looking for candidates who may be flexible for working on weekends and gives a priority 2 (a low priority value) for the same attribute non-working weekends. In this case, the priority-distance may be large and hence the job seeker score for this case may be low for the job vacancy posted by the truck company. In cases where the priority values of the job seeker and the job provider may be almost the same values, the priority-distance may be low and such matches may be recommended for both the job seekers and job providers.

In some embodiments, value-distance and the priority distance may be considered for computing the final score i.e. the job seeker score and the job provider score. The score computing algorithm may compute an attribute component score, which may be the score for each attribute in the profile. The attribute component score values may be computed based on attribute specific matching factors. The attribute component may be initially set to zero. A unit score between zero and one may be determined as the reciprocal of the number of attribute values which exist for the attribute. For example, if there are 5 components associated with an attribute then the unit score may be 0.2. Thereafter, the score computing algorithm may consider the priority values associated with each component of the attribute. The values assigned with a high priority value may be multiplied with a higher weight factor than the values assigned with a lower priority value. For example, a priority of 5 may be assigned to a value v1 and priority of 3 may be assigned to the value v2, the attribute component score would be 0.2×0.5+0.2× 0.3=0.16. In this manner, the attribute component score may be computed for all the attributes in the profile. Finally, the individual attribute component score may be added to determine the final score, which may be then assigned to the job seeker or the job provider. The final score value may be used for matching the profiles of job seekers with appropriate jobs and the job providers with appropriate candidates. In some cases, the final score may exceed the value one (1) which may be the maximum value. In such a case, the value may be rounded off to 1 and may be considered a best match for an appropriate job opening.

In some embodiments, the profile matching service may predict a likelihood of match corresponding to a job seeker. Further, the prediction may be performed based on an analysis of each of the plurality of job seeker values and a job seeker priority. Further, the profile matching service may consider the parameters such as, but not limited to, attributes, values and priority values of the attribute and values a prediction of likelihood of match may be computed. Furthermore, the profile matching service may include one or more statistical classification algorithms for classifying the job profiles of one or more job seekers based on the one or more aforementioned parameters. The statistical classification algorithms may include Max Diff, Naïve Bayes classifier, K nearest neighbor classifier, Random forests and the like. The classification feature may provide efficient profile matching. Further, the profile matching algorithms may use appropriate machine learning algorithms for learning the characteristics of the best matching profile. The machine learning algorithms may be trained, using supervised or unsupervised training methods, to learn the parameters of the best matching profile and the least matching profiles. After the training phase, the profile matching algorithm may automatically rank the best matching profiles. The profile matching algorithm when combined with a machine learning algorithm may automatically adjust the profile matching parameters as and when the requirements of the job seekers and job providers change.

Figure 6:
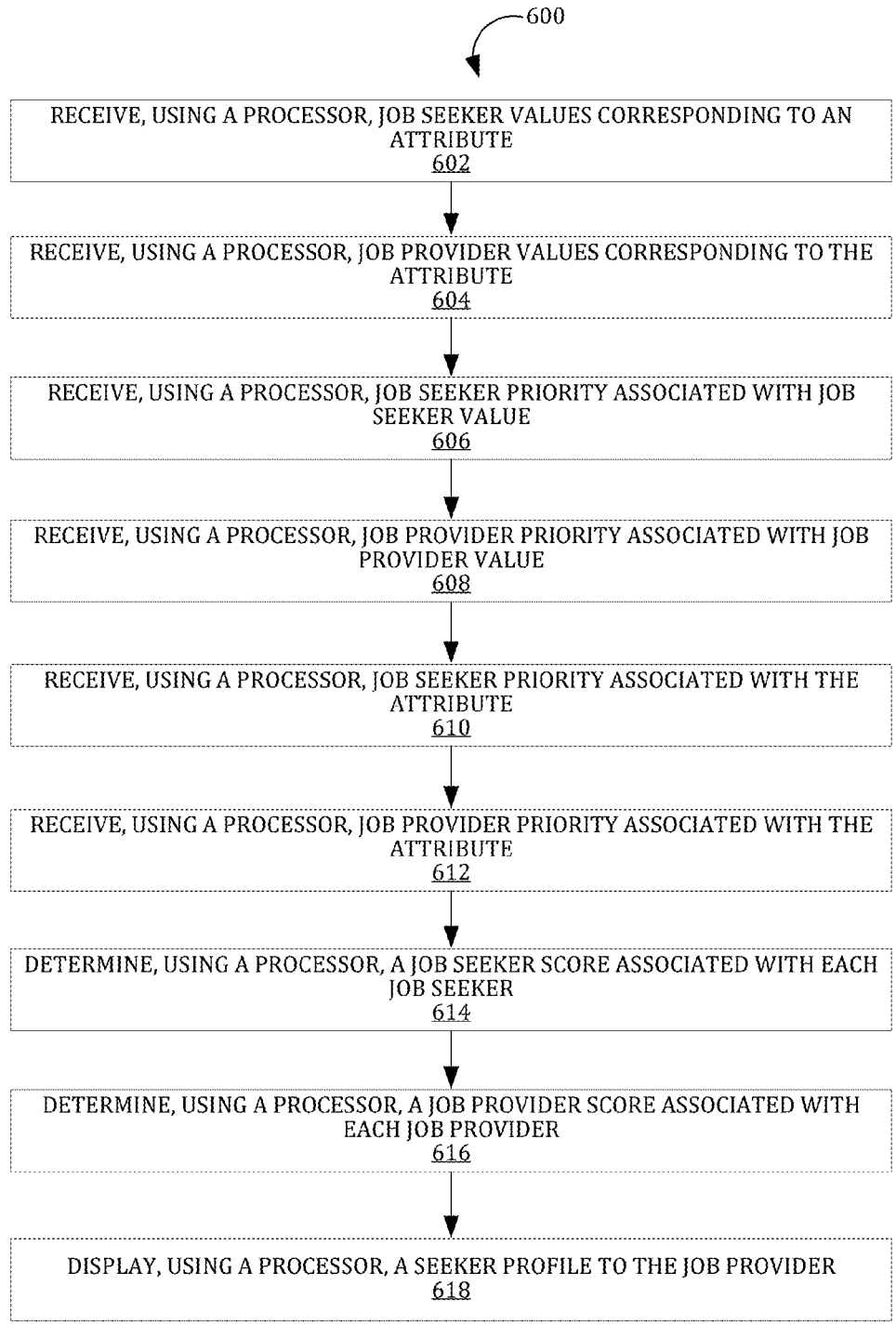
FIG. 6 illustrates a flow diagram of the method steps for matching job seekers with job providers according to various embodiments.

FIG. 6 illustrates a flow diagram of the method steps for matching job seekers with job providers, in accordance with some embodiments. For the explanation for steps 602 through 608, one may refer to the FIG. 2 (steps 202-208). At step 610, a job seeker priority associated with the attribute may be received using a processor. In this embodiment, the job seeker assigns a priority not only to the values associated with the attributes but the attributes themselves. Assigning such a priority value to the attribute provides additional level of tuning parameters for the score computing algorithms for generating the job seeker score and the job provider score. For example, the profile of a job seeker who may be a truck driver may have attributes such as work, pay, personal development, retirement plans and so on. The job seeker may provide priority values for the attributes. In an example, a truck driver may provide a better priority for personal development than retirement plans. Subsequently, the job seeker score may be computed to reflect the same. Referring back to FIG. 3, one may observe that the priority value 308 may be associated with the attribute. The job seeker can enter a desired value for the priority value 308 while filling up the profile. The priority value 308 may be considered for the generation of a job seeker score.

At step 612, a job provider priority associated with the attribute may be received using a processor. The job provider may provide ratings to the attributes based on the company policies and payment practices. For example, a trucking company may be posting a job with attributes such as work, pay, personal development, retirement benefits. The company may not have an exciting retirement benefits but may have a great structure for personal development. Therefore, the trucking company may provide a better priority rating to personal development while proving a low priority for retirement benefits. In this case, a job seeker who has also provided a better rating for personal development attribute than the retirement plan may be considered as a better match. In contrast, a job seeker proving high value to the attribute retirement plans and low rating for the attribute personal development may receive a low score and hence may not be a preferred match for the job opening posted by the trucking company. Similarly, referring to FIG. 4, the job provider may provide priority value 408 to the attributes. The job seeker may enter a desired value for the priority value 408 while filling up the profile. The priority value 408 may be considered for the generation of a job provider score.

Further, the subsequent steps 614-618 may be identical with the steps 210-210, as explained in detail with reference to FIG. 2.

Figure 7:
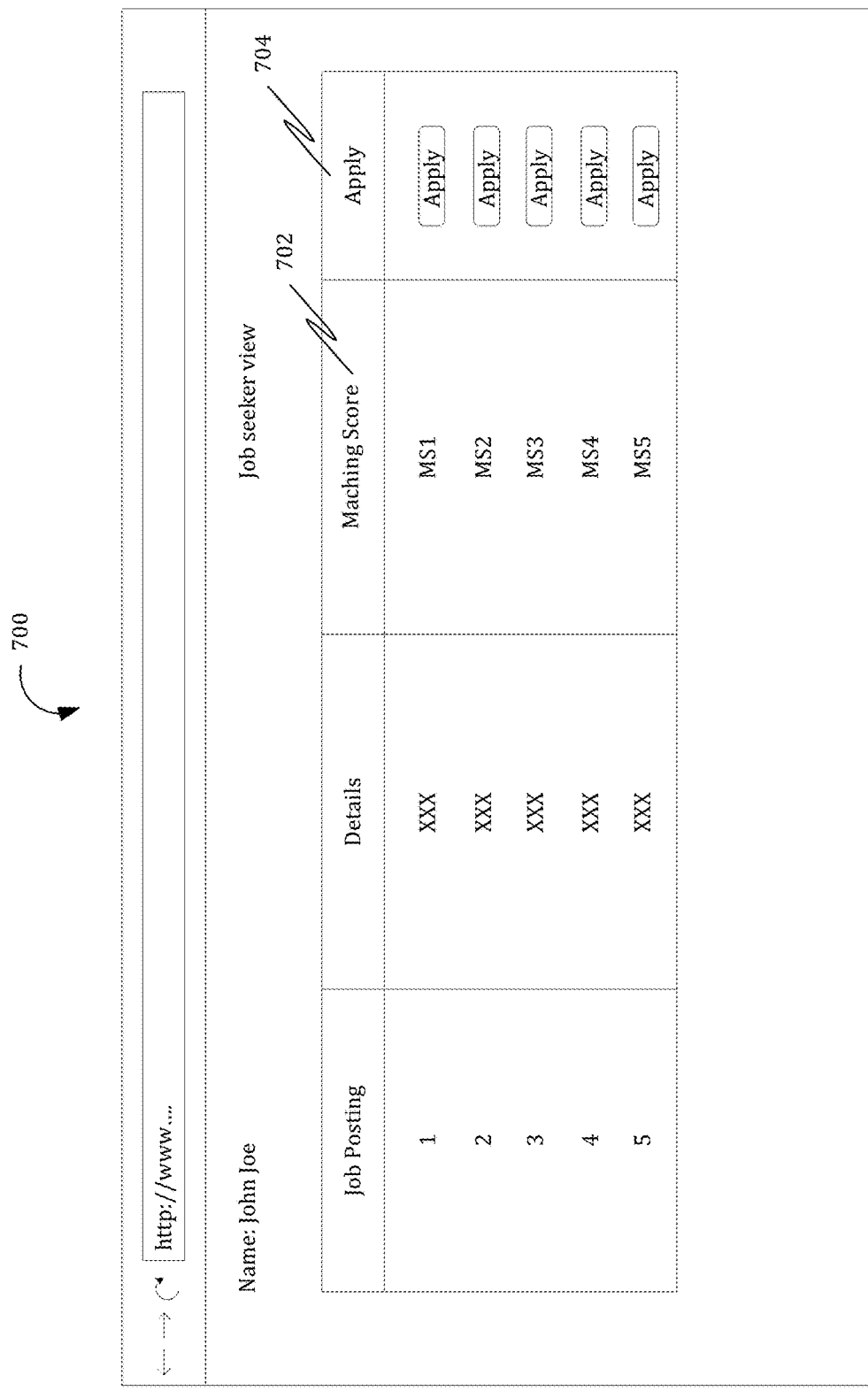
FIG. 7 illustrates an exemplary view provided to a job seeker in accordance with various embodiments.

FIG. 7 illustrates an exemplary view 700 provided to a job seeker in accordance with various embodiments. The view 700 illustrates a view provided by the profile matching service to the job seeker. The view may be a graphical user interface (GUI) with which the job seeker may interact with. The GUI may be rendered on stationary or handheld computing devices, such as, but not limited to laptops, mobiles and workstations. The view 700 may indicate the details of the most relevant job postings for the job seeker. The job postings may be ranked based on a matching score between the job seeker and the job provider. The view 700 may include a column which may comprise the details of the job and another column 702 with the corresponding matching score. The matching score may be computed by comparing the attributes, values and the priorities of the job seeker and the job provider. Further, the column 704 may include an apply button, which when pressed by the job seeker transmits, using a processor, a job application to at least one job provider corresponding to the at least one job posting. The job application may include the job profile which may include all the details as desired by the job provider.

FIG. 8 illustrates an exemplary view 800 provided to a job provider in accordance with various embodiments. In the view 800, a job provider may receive a plurality of job profiles corresponding to the of job seekers, where the displaying may be performed based on the job seeker score associated with each job seeker. The column 802 may include the names of the most suitable candidates for a particular job opening posted by the job provider. Further, column 804 may include one or more details of the job seekers. The job provider may be able to view the details of the job seekers. In some embodiments, displaying of a job profile may be based on an access restriction provided by a job seeker associated with the job profile. The access restriction may forbid displaying of profile data that may be included in the job profile. In such cases, the job provider may request the job seeker for the details which were not accessible. Thereafter, the job seeker may transmit a grant for viewing of the at least one profile data after which the job seeker may be able to view the further details.

In some embodiments, profile data corresponding to a job seeker may be retrieved automatically from one or more databases. For example, the profile data of the job seeker may be generated using a government database. Further, each job seeker may be associated with a job profile, wherein at least one of a content and a form of the job profile may be based on a governmental regulation. For example, some sensitive details in the profile of the job seeker may be governed by government rules. In an instance, a person infected by HIV may not have the information provided in the job seeker profile. Other maladies, however, may serve to disqualify the candidate from employment. For example, a truck driver with diabetes may not eligible to operate a truck and his CDL may be revoked.

In view 800, column 806 indicates the score match between the profiles of the job seeker with that of the job opening. The job seeker profiles may be ranked based on the score match. Further, the column 808 may include an invite button, which when activated by the job provider transmits an invitation a one job seeker corresponding to the job profile, where the invitation may include the job posting.

Figure 9:
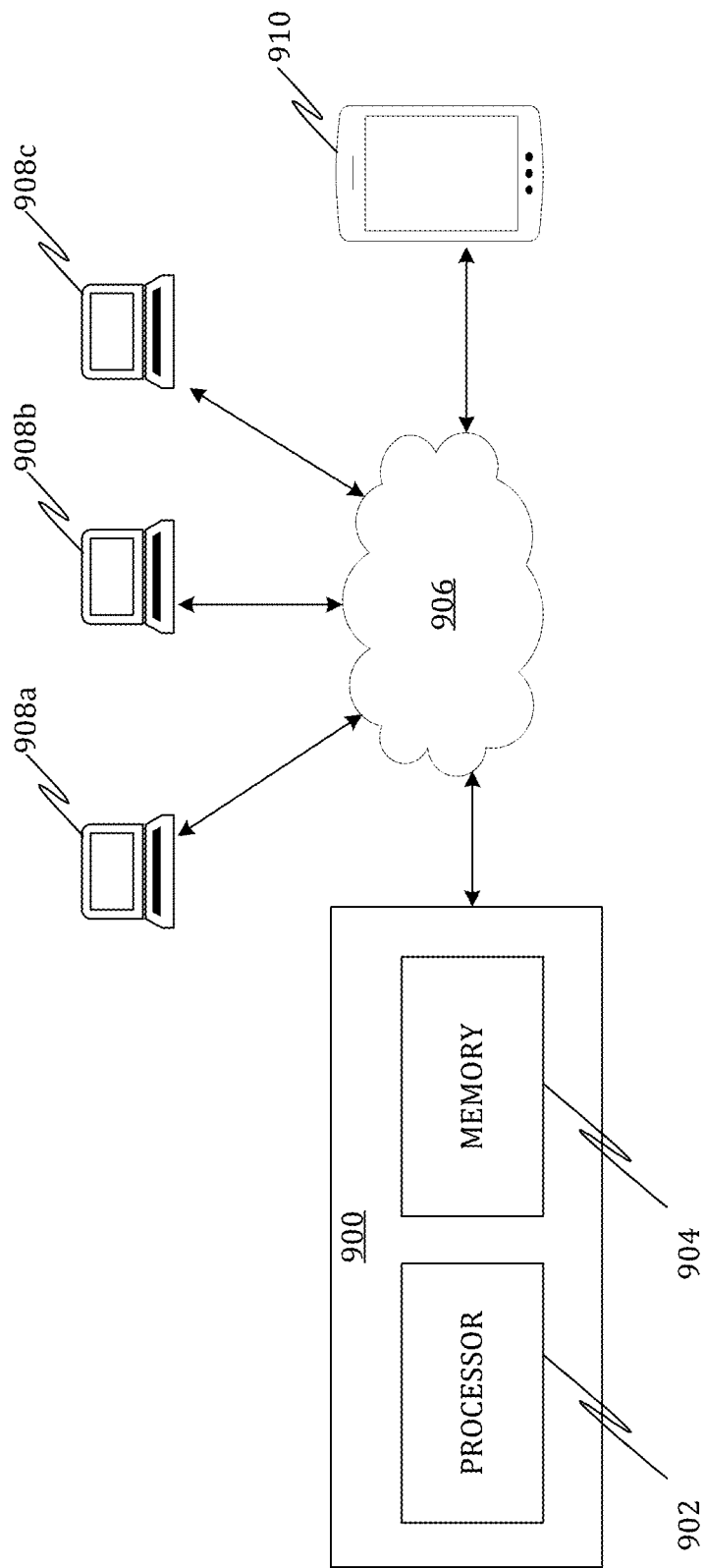
FIG. 9 illustrates a block diagram of a system for matching job seekers with job providers according to various embodiments

FIG. 9 illustrates a block diagram of a system 900 for matching job seekers with job providers according to various embodiments. In some embodiments, the system 900 may include a server for processing requests from client devices. The system 900 may include a processor 902 and a memory 904. Further, the system 900 may be configured to communicate over a communication network 906 which may be an instance of network 110 as explained in conjunction with FIG. 1. Accordingly, in some embodiments, the system 900 may include a network interface module (not shown in figure). In some other embodiments, the communication network 906 may be an internal system bus. Additionally, the system 900 may be configured to communicate with one or more client devices 908, such as 908a, 908b and 908c. Further, in some embodiments, the communication may take place over the communication network 906.

Further, the memory 904 may be communicatively coupled to the processor 902. Further, the memory 904 may be configured to store a program code which when executed by the processor, causes the system 900 to match job seekers with job provider based on a job seeker score and a job provider score. Further, the program code, when executed, may cause the system 900 receive a plurality of job seeker values corresponding to an attribute of a plurality of attributes. Further, the program code, when executed, may cause the system 900 to receive a plurality of job provider values corresponding to the attribute of the plurality of attributes. Further, the program code, when executed, may cause the system 900 to receive at least one job seeker priority associated with at least one job seeker value of the plurality of job seeker values. Further, the program code, when executed, may cause the system 900 to receive at least one job provider priority associated with at least one job provider value of the plurality of job provider values. Further, the system 900 may be configured to determine a job seeker score associated with each job seeker. The job seeker score may be determined based on each of a comparison of the plurality of job seeker values and a comparison of job seeker priority with the job provider priority. Furthermore, the system 900 may be configured to determine a job provider score associated with each job provider. The job provider score associated with a job provider may be determined based on each of a comparison of job seeker values with the job provider values and a comparison of job seeker priority with the job provider priority. Further details about the methods that the system 100 may be configured to perform are explained in conjunction with FIG. 2-8.

While various embodiments of the disclosed methods and systems have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

IV. Profile Matching Server Architecture

Platform 100 may be embodied as, for example, but not be limited to, a website, a web application, a desktop application, and a mobile application compatible with a computing device. The profile matching server 100 may comprise, but not be limited to, a desktop computer, laptop, a tablet, or mobile telecommunications device. Moreover, the platform 100 may be hosted on a centralized server, such as, for example, a cloud computing service. Although methods of FIG. 2-8 have been described to be performed by the profile matching server 100, it should be understood that, in some embodiments, different operations may be performed by different networked elements in operative communication with the profile matching server 100.

Embodiments of the present disclosure may comprise a system having a memory storage and a processing unit. The processing unit coupled to the memory storage, wherein the processing unit may be configured to perform the stages of methods of FIG. 2-8.

Figure 10:
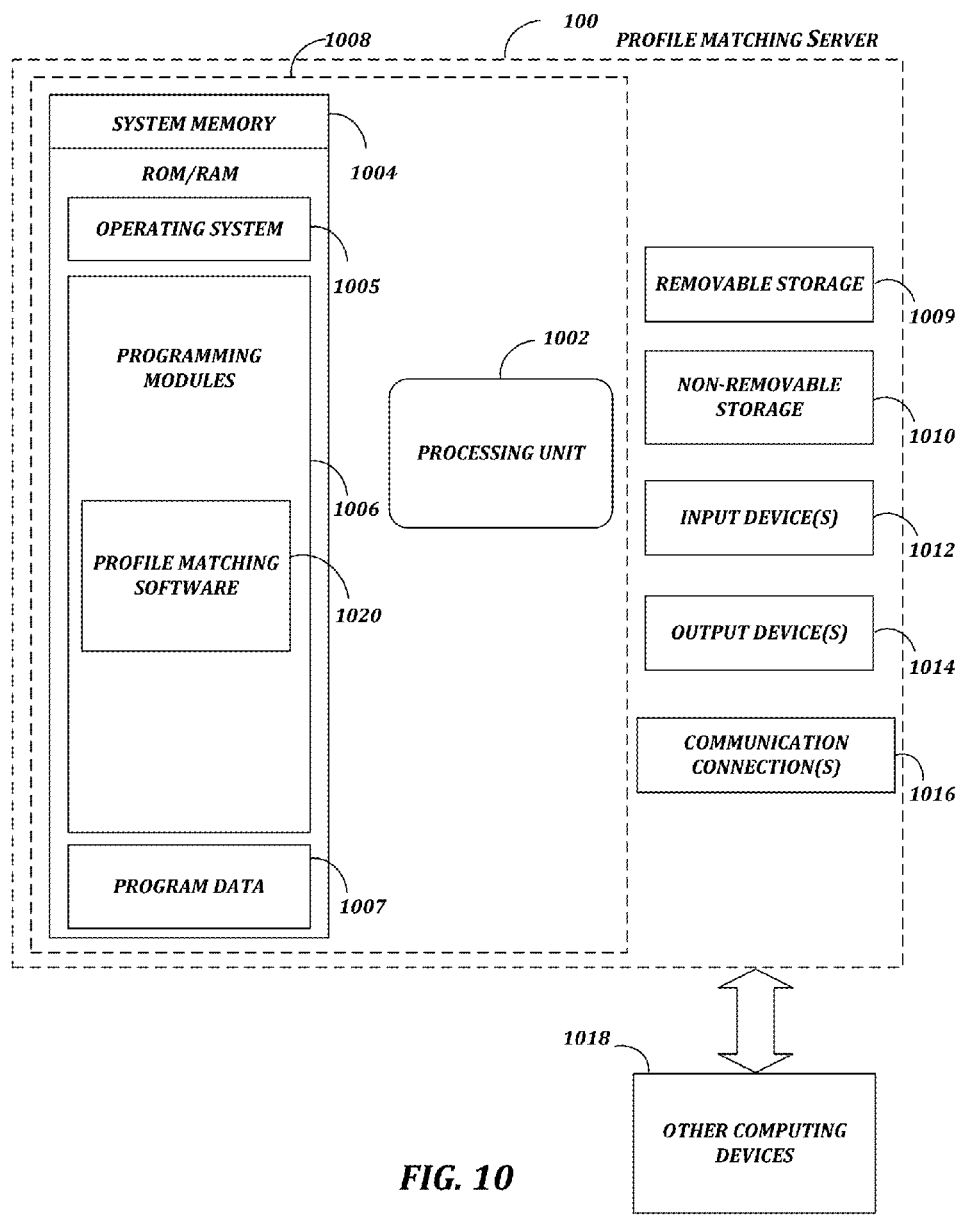
FIG. 10 illustrates a block diagram of a profile matching server configured to perform the methods of FIG. 2-8.

FIG. 10 is a block diagram of a system including profile matching server 100. Consistent with various embodiments of the disclosure, the aforementioned memory storage and processing unit may be implemented in a computing device, such as profile matching server 100 of FIG. 1. Any suitable combination of hardware, software, or firmware may be used to implement the memory storage and processing unit. For example, the memory storage and processing unit may be implemented with profile matching server 100 or any of other computing devices 1018, in combination with profile matching server 100. The aforementioned system, device, and processors are examples and other systems, devices, and processors may comprise the aforementioned memory storage and processing unit, consistent with embodiments of the disclosure.

With reference to FIG. 10, a system consistent with various embodiments of the disclosure may include a computing device, such as profile matching server 100. In a basic configuration, profile matching server 100 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include operating system 1005, one or more programming modules 1006, and may include a program data 1007. Operating system 1005, for example, may be suitable for controlling profile matching server 100's operation. In one embodiment, programming modules 1006 may include profile matching software 1020. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Profile matching server 100 may have additional features or functionality. For example, profile matching server 100 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and nonvolatile, removable and non-removable media implemented in any method or technology for storage of information, such as computer readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the profile matching server 100. Any such computer storage media may be part of the profile matching server 100. Profile matching server 100 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

Profile matching server 100 may also contain a communication connection 1016 that may allow profile matching server 100 to communicate with other computing devices 1018, such as over a network in a distributed computing environment, for example, an intranet or the Internet. Communication connection 1016 may be one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1004, including operating system 1005. While executing on processing unit 1002, programming modules 1006 (e.g., profile matching software 1020) may perform processes including, for example, one or more stages of methods of FIG. 2-8 as described above. The aforementioned process is an example, and processing unit 1002 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks may be performed by remote processing devices that may be linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A processor-implemented method of matching job seekers with job providers, the processor-implemented automatically carried out as a cooperative sequence of acts by a processor executing program code stored in a computer storage media, the processor-implemented method comprising: via a communication connection coupled to the processor: receiving a plurality of job seeker values corresponding to an attribute of a plurality of attributes; receiving a plurality of job provider values corresponding to the attribute of the plurality of attributes; receiving at least one job seeker priority associated with at least one job seeker value of the plurality of job seeker values; and receiving at least one job provider priority associated with at least one job provider value of the plurality of job provider values; detecting a first conflict based on the at least one job seeker value and the at least one job seeker priority, and detecting a second conflict based on the at least one job provider value and the at least one job provider priority; predicting a first likelihood of a match a first job seeker to at least one job provider, and predicting a second likelihood of a match for a first job provider to at least one job seeker; via a first display coupled to the processor, providing a conflict alert representing the detected first conflict to the first job seeker; via a second display coupled to the processor, providing a conflict alert representing the detected second conflict to the first job provider; via the communication connection coupled to the processor: receiving first modifications to at least one of the at least one job seeker priority and the at least one job seeker value, so as to eliminate the first conflict and to increase the first likelihood of the match for the first job seeker to the at least one job provider; and receiving second modifications to at least one of the at least one job provider priority and the at least one job provider value, so as to eliminate the second conflict and to increase the second likelihood of the match for the first job provider to the at least one job seeker; determining at least one job seeker score associated with the first job seeker, the at least one job seeker score based on each of: a comparison of the plurality of job seeker values with the plurality of job provider values; and a comparison of the at least one job seeker priority with the at least one job provider priority; (and) determining at least one job provider score associated with the first job provider, the at least one job provider score based on each of: a comparison of the plurality of job seeker values with the plurality of job provider values; and a comparison of the at least one job seeker priority with the at least one job provider priority; and via a display coupled to the processor, presenting the at least one job seeker score and the at least one job provider score.

2. The method of claim 1, wherein at least one of the at least one job seeker priority and the at least one job provider priority comprises at least one of maximum and minimum.

3. The method of claim 1, wherein the at least one job seeker score associated with the at least one job seeker is determined based on each of:
 a value-distance between the plurality of job seeker values and the plurality of job provider values, and
 a priority-distance between the at least one job seeker priority and the at least one job provider priority,
 wherein the at least one job provider score associated with the at least one job provider is determined based on each of:
  the value-distance between the plurality of job seeker values and the plurality of job provider values, and
  the priority-distance between the at least one job seeker priority and the at least one job provider priority.

4. The method of claim 1, further comprising displaying a plurality of job profiles corresponding to the plurality of job seekers, wherein the displaying is performed based on the at least one job seeker score.

5. The method of claim 4, further comprising:
receiving an invite input corresponding to at least one job profile of the plurality of job profiles; and
transmitting an invitation to the at least one job seeker corresponding to the at least one job profile, wherein the invitation comprises the job posting.

6. The method of claim 4, wherein the displaying of a job profile of the plurality of job profiles is based on an access restriction provided by a job seeker associated with the job profile, wherein the access restriction forbids displaying of at least one profile data comprised in the job profile.

7. The method of claim 5, further comprising:
receiving a request for viewing the at last one profile data;
receiving a grant for viewing of the at least one profile data, wherein the displaying of the job profile comprising the at least one profile data is based on the grant.

8. The method of claim 1, further comprising displaying, using a processor, a plurality of job postings corresponding to the plurality of job providers, wherein the displaying is performed based on the job provider score associated with each job provider of the plurality of job providers.

9. The method of claim 8, further comprising:
receiving from a job seeker, an apply input corresponding to at least one job posting of the plurality of job postings; and
transmitting job application to at least one job provider corresponding to the at least one job posting, wherein the job application comprises a job profile corresponding to the job seeker.

10. The method of claim 9, wherein the job application further comprises a job seeker score associated with the job seeker.

11. The method of claim 1, further comprising:
retrieving profile data corresponding to a job seeker of the plurality of job seekers; and
generating at least a part of a job profile associated with a job seeker of the plurality of job seekers based on the profile data.

12. The method of claim 8, wherein retrieving the profile data comprises retrieving the profile data from a data source comprising a government database.

13. The method of claim 1, wherein each job seeker is associated with a job profile, wherein at least one of a content and a form of the job profile is based on a governmental regulation.

14. The method of claim 1, wherein predicting the first and second likelihood of the match comprises predicting based on at least one of the following:
the at least one job provider priority,
the at least one job provider value,
the at least one job seeker value, and
the at least one job seeker priority.

* * * * *